United States Patent

[11] 3,634,003

[72] Inventor David Guyton
5505 Huntington Parkway, Bethesda, Md. 20014
[21] Appl. No. 235
[22] Filed Jan. 2, 1970
[45] Patented Jan. 11, 1972

[54] OPTICAL SYSTEM FOR IMAGING SCHEINER APERTURES IN AN OPTOMETER
7 Claims, 3 Drawing Figs.

[52] U.S. Cl..................................... 351/17, 351/6, 351/13
[51] Int. Cl..................................... A61b 3/00, A61b 3/02
[50] Field of Search......................... 351/6, 13, 17, 27, 14; 356/125

[56] References Cited
UNITED STATES PATENTS
1,235,170  7/1917  Thorner ..................... 351/27

Primary Examiner—David Schonberg
Assistant Examiner—Paul A. Sacher
Attorney—John M. Brandt ABSTRACT: In an optometer of the type employing Scheiner apertures, an optical system is disclosed for projecting those apertures into a plane proximate to the eye, most commonly the plane of the pupil. According to the arrangement of the system, the plane of projection of the apertures and the plane of refraction, that is, the vertex distance of refraction, are separable.

PATENTED JAN 11 1972

3,634,003

INVENTOR
DAVID GUYTON
BY
John M. Berndt
ATTORNEY

OPTICAL SYSTEM FOR IMAGING SCHEINER APERTURES IN AN OPTOMETER

BACKGROUND OF THE INVENTION

1. Field of the Invention

The invention resides in the field of optometers and may be applied to either objective or subjective optometers employing Scheiner apertures in conjunction with a simple optometer which apertures serve as a means for refining the determination of the correction for an ametropic eye.

2. Description of the Prior Art

The use of Scheiner apertures in combination with a simple optometer as a means for refining the determination of the correction for an ametropic eye is well known in the prior art. An explanation of the use of these apertures may be found in several texts dealing with physiological optics, Ogle's Optics, for example.

Similarly, optometers which project images of Scheiner apertures into planes proximate to the eye are known. For example, U.S. Pat. No. 1,235,170 issued to W. Thorner shows the basic design of an optometer in which a target, an "aperture" consisting of a lamp filament rather than consisting of a hole in an opaque plate, and a projecting lens are mounted so as to be moveable together. The "aperture" is placed at the principal focal point of the projecting lens. Thus, the rays from each point of the "aperture" are parallel when received by the optometer lens regardless of the position of the moveable assembly with the result that the optometer lens always focuses the "aperture" in its principal focal plane, which plane is also arranged to be the pupillary plane. A prism arrangement is included to effectively double the "aperture" image in the pupillary plane, creating Scheiner apertures through which the target is viewed.

The Thorner apparatus is further arranged to determine correction or refract at the principal focal plane of the optometer lens. That is, the scale of the instrument is calibrated to this plane. Only by refracting in the principal focal plane of the optometer lens can target displacement be linearly related to diopters of correction on the scale. Such an arrangement is used in optometers almost universally.

Therefore, while the advantage of projecting Scheiner apertures into the pupillary plane is gained, the ability to determine correction with a linear instrument scale at planes other than that of the pupil is lost. This is an important consideration, for corrective lenses are always placed some distance in front of the pupillary plane, and the necessary power for a corrective lens varies with its distance from the eye.

In the objective optometer described in U.S. Pat. No. 1,649,114 issued to O. Henker, apertures are imaged by the optometer lens in the pupillary plane, which, in this instrument, is a different plane from the principal focal plane of the optometer lens. Again, refraction is determined at the principal focal plane of the optometer lens. Thus both the advantage of apertures projected into the pupillary plane and the further advantage of determining refractive correction at another plane a small distance from the pupillary plane are gained in this system. However, the magnitude of the distance between the two planes depends entirely upon the position of the apertures in relation to the optometer lens. For refracting at very small vertex distances approaching zero as is necessary for contact lenses, the apertures in this instrument would have to be placed at a great distance from the optometer lens in order to obtain aperture images sufficiently close to the principal focal plane of the optometer lens. This would require a long optometer tube providing impractical and unwieldy.

SUMMARY OF THE INVENTION

The disadvantages inherent in the prior art may be overcome by interposing an optical system, most simply a converging lens, between the aperture plate and the optometer lens which system in combination with the optometer lens causes the apertures to be imaged in a plane proximate to the eye and at a selected distance from the principal focal plane or plane of refraction of the optometer lens.

In the most basic embodiment of the invention an imaging lens is fixed within the optometer tube between the aperture plate and the optometer lens to image the apertures in a preselected plane. In another embodiment of the invention, means for moving the aperture plate and separate means for adjusting the position of the eye in relation to the optometer lens are provided to vary the vertex distance of refraction while still imaging the apertures in the pupillary plane. In a special case of this second embodiment, the focal lengths of the optometer lens and imaging lens are selected to provide for a single means for synchronously moving the aperture plate and the eye positioning means.

The foregoing description of features, objects, and advantages of the present invention will become more apparent from the following detailed specification when read in conjunction with the following drawing in which.

DESCRIPTION OF THE PREFERRED EMBODIMENTS

Figure 1:
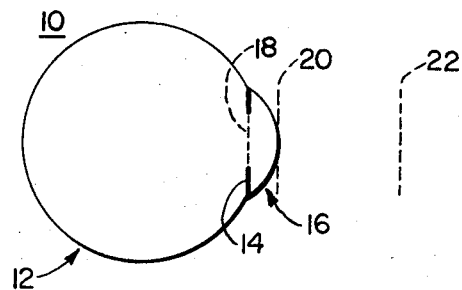
FIG. 1 is an explanatory diagram showing aperture image and refraction planes with respect to the eye.

Referring first to FIG. 1, there is shown for purposes of explanation what is meant by aperture image and refraction planes.

The eye 10 consists of retina 12, iris 14, and cornea 16. Plane 18 is the pupillary plane. Plane 20 is the plane in which one would wish to refract for contact lenses. Plane 22, which may vary in distance from the cornea up to approximately 15 millimeters, is the plane in which one would refract for spectacle lenses.

In using Scheiner apertures in an optometer it should be understood that the farther apart the apertures are placed, the greater the displacement of the images on the retina will be for any given power error, making the determination of this error more accurate. However, creating Scheiner apertures by placing a diaphragm with holes in it in front of the pupil has certain disadvantages. Because of the range of diverging or negative correction for the myopic eye which the optometer must simulate, Scheiner apertures placed in front of the eye have to be separated less than the diameter of the pupil. This is because the two beams of light which continue to diverge after passing through the Scheiner apertures must still both pass through the pupil of the eye. Although such an arrangement utilizes the full diameter of the pupil when large negative corrections are simulated, the diameter of the pupil utilized for simulated positive corrections using the same apparatus is markedly decreased.

Additionally, very small apertures in a diaphragm are difficult to align and are equally difficult to keep clean. Thus, by projecting the apertures into pupillary plane 18, these difficulties are overcome. The present invention projects these apertures into the pupillary plane and additionally provides means for refracting the eye at any vertex distance between plane 20 and plane 22.

Figure 2:
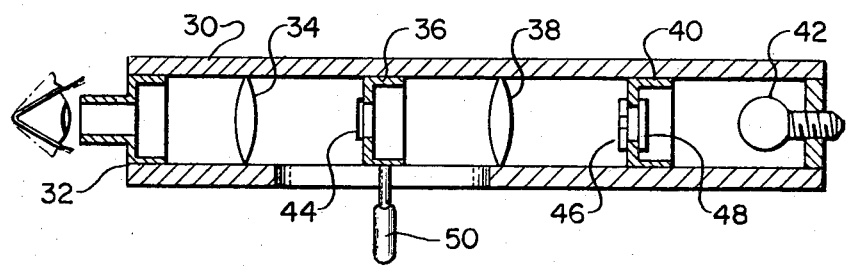
FIG. 2 is a cross-sectional view of one embodiment of the invention.

Referring now to FIG. 2, there is shown a cross-sectional view of the basic embodiment of the invention. Tube 30 is mounted on supports, not shown, and is fitted with eyepiece 32, optometer lens 34, target holder 36, imaging lens 38, aperture plate holder 40 and illuminating means 42, a light bulb for example. Target 44, a stretched wire, for example, is mounted on holder 36, and aperture plate 46 containing two Scheiner apertures is mounted on holder 40. A diffusing plate 48 is mounted behind the aperture plate to insure uniformity of illumination.

In use the apertures are imaged by lenses 38 and 34 into the pupillary plane of the subject as shown in FIG. 1. The focal plane of lens 34 is positioned at or between planes 20 and 22 of FIG. 1, and the correction scale is linearly calibrated to that focal plane. The scale not shown may be located on the outside of the tube and a marker for reading the scale attached to holder 36.

The target is moved back and forth by handle 50 until proper alignment of images is achieved. As was mentioned above, the use of Scheiner apertures and the conditions of alignment on the retina of images observed through the apertures are old in the art and form no part of this invention.

The following approximate dimensions and parameters may be used to construct apparatus which will conform to the above specifications:

100 mm.—optometer lens focal length
150 mm.—aperture imaging lens focal length
0 mm.—distance between adjacent principal foci of the two lenses
143.25 mm.—distance of aperture plate from imaging lens
103 mm.—distance of pupillary plane from optometer lens.

These dimensions will allow refraction in a a plane 3 mm. from the pupillary plane, or at a vertex distance of approximately zero. It is of course within the skill of one versed in the art to vary these dimensions to achieve different separations of pupillary and refraction planes.

Figure 3:
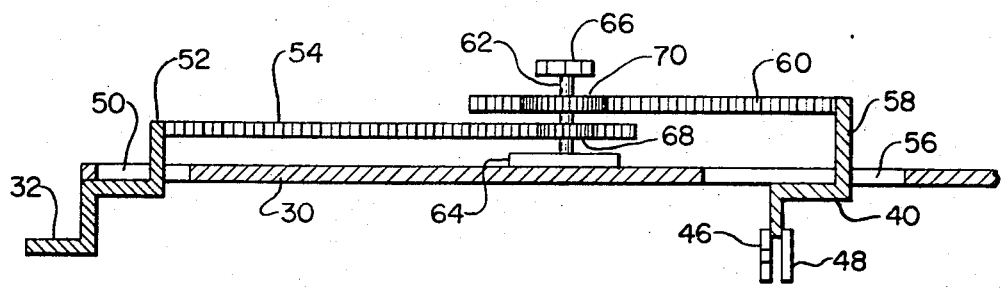
FIG. 3 is a cross-sectional view of an additional embodiment of the invention.

Turning to FIG. 3, there is shown apparatus which may be used to provide a variable vertex distance of refraction in the same optometer. This apparatus will be described first for the special case in which lenses 34 and 38 form a telescopic system. As in FIG. 2, optometer tube 30 has eyepiece 32 and target holder 40 mounted therein. Arm 52 attached to eyepiece 32 passes through slot 50 and arm 58 attached to aperture plate holder 40 passes through slot 56. Extension arm 54 is mounted on eyepiece arm 52 and extension arm 60 is mounted on aperture plate holder arm 58. Both extension arms are fitted with gear teeth.

Knob 66 is fixed to shaft 62 rotatably mounted on base 64 attached to tube 30. Gear wheels 68 and 70 are additionally mounted on shaft 62 and mesh with extension arms 54 and 60 respectively. Rotation of knob 66 moves extension arms 54 and 60, thus moving the eyepiece and the aperture plate together. The principal focal plane of optometer lens 34, and thus the plane of refraction, remains fixed. Therefore by rotating knob 66 the pupillary plane of the eye and the aperture plate which is imaged into the pupillary plane by lenses 38 and 34 are moved back and forth relative to the plane of refraction, effectively changing the vertex distance of refraction. A scale, not shown, may be fitted next to the knob 66 to indicate the vertex distance of refraction directly.

The relative amounts which the eyepiece and aperture plate must move to maintain the images of the apertures in the pupillary plane depend upon the focal lengths and positioning of lenses 38 and 34. As was noted above, the present description applies to the special case in which lenses 34 and 38 form a telescopic system. That is, lenses 34 and 38 are positioned such that the anterior principal focus of lens 38 coincides with the posterior principal focus of lens 34, considering "anterior" to be towards the eye.

It is well known that the axial magnification of a telescopic system is constant and is equal to the reciprocal of the square of the power of the telescopic system. The telescopic system formed by lenses 38 and 34 has a power equal to the focal length of lens 38 divided by the focal length of lens 34, or $f_{38}/f_{34}$. Thus the axial magnification of this telescopic system is equal to $(f_{34}/f_{38})^2$. For instance, if the focal length of lens 38 is twice the focal length of lens 34, the axial magnification of the telescopic system is one-fourth. This means that if the aperture plate 46 is displaced axially a certain amount, the images of the apertures formed in the pupillary plane by the telescopic system will be displaced axially in the same direction but only one-fourth as much. Therefore, since the pupillary plane is assumed to be in a constant position in relation to the eyepiece 32, the eyepiece must move in the same direction but only one-fourth as much as the aperture plate in order that the images of the apertures continue to be formed in the pupillary plane.

The relative movement of eyepiece 32 and aperture plate 46 may be controlled by selecting the diameters of the gearwheels 68 and 70. If the telescopic system has a power of one, the gearwheels are made of equal diameter. If the power is two, gearwheel 70 is made to be four times the diameter of gearwheel 68.

Turning now to the general case of providing a variable vertex distance of refraction when lenses 38 and 34 do not form a telescopic system, it is evident that since the axial magnification of the system is no longer constant, there is no longer a linear relationship between the displacements of the aperture plate 46 and the resulting necessary displacements of the eyepiece 2. Thus, the positions of the aperture plate 46 and eyepiece 32 must be adjusted separately or must be related by a nonlinear linkage, not shown in the drawing.

In both the general case and in the special case of a telescopic system it will be appreciated that various mechanical arrangements and linkages may be used to accomplish the relative repositioning of the eye and the aperture plate to vary the vertex distance or point of refraction. Separate gear system, screw feeds, cam systems and the like may be used, all of which would be obvious to those skilled in the art.

What is claimed is:

1. In an optometer for determining the refractive correction for the eye in combination:
   a. an optometer lens;
   b. a target located on the posterior side of said lens to provide determination of said refractive correction at the anterior focal plane of said lens;
   c. Scheiner apertures located on the posterior side of said optometer lens; and
   d. an optical system which, in combination with said optometer lens, images said apertures in a second plane approximate to the eye, said second plane distinct from said interior focal plane.

2. The apparatus of claim 1 including first adjustable positioning means for varying the position of the eye on the optical axis of said optometer lens.

3. The apparatus of claim 2 including second adjustable positioning means for varying the position of said plane.

4. The apparatus of claim 3 wherein said second adjustable means comprises means for adjusting the position of said apertures along said optical axis.

5. The apparatus of claim 4 wherein said optical system comprises a converging lens, and said converging lens and said optometer lens are positioned to form a telescopic system for imaging said apertures in said second plane.

6. The apparatus of claim 4 including linking means for simultaneously operating said first and second adjustable positioning means.

7. The apparatus of claim 5 including linking means for simultaneously operating said first and second adjustable positioning means.

* * * * *

UNITED STATES PATENT OFFICE
CERTIFICATE OF CORRECTION

Patent No. 3,634,003            Dated January 11, 1972

Inventor(s) David Guyton

It is certified that error appears in the above-identified patent and that said Letters Patent are hereby corrected as shown below:

Column 4, line 21 - "eyepiece 32 . . ."

Column 4, line 43 - "interior" should be "anterior"

Column 4, line 48 - "the position of said second plane"

Signed and sealed this 13th day of November 1973.

(SEAL)
Attest:

EDWARD M. FLETCHER, JR.
Attesting Officer

RENE D. TEGTMEYER
Acting Commissioner of Patents